United States Patent [19]

Shibuya

[11] Patent Number: 4,644,213
[45] Date of Patent: Feb. 17, 1987

[54] PIEZOELECTRIC ACTUATOR

[75] Inventor: Tsuyoshi Shibuya, Chofu, Japan

[73] Assignee: Tokyo Juki Industrial Co., Ltd., Chofu, Japan

[21] Appl. No.: 823,478

[22] Filed: Jan. 28, 1986

[30] Foreign Application Priority Data

Jan. 29, 1985 [JP] Japan .................................. 60-15073

[51] Int. Cl.⁴ ............................................ H01L 41/08
[52] U.S. Cl. .................................................... 310/328
[58] Field of Search ................................ 310/323, 328

[56] References Cited

U.S. PATENT DOCUMENTS

| | | | |
|---|---|---|---|
| 3,649,857 | 3/1972 | Knappe | 310/328 X |
| 4,435,666 | 3/1984 | Fukui et al. | 310/328 |
| 4,518,887 | 5/1985 | Yano et al. | 310/328 |
| 4,547,086 | 10/1985 | Matsumoto et al. | 310/328 X |

Primary Examiner—Mark O. Budd
Attorney, Agent, or Firm—Morgan & Finnegan

[57] ABSTRACT

A mechanical amplifier for a piezoelectric actuator employs a lever-link system having a lever and a fulcrum to amplify a displacement caused by the piezoelectric effect of the piezoelectric element. A fulcrum supporting a last amplified lever forms a semi-pivotal construction to strengthen the stiffness of the amplifier. The invention converts electrical energy into mechanical energy for application to a printer or other electronic instruments.

3 Claims, 9 Drawing Figures

FIG. IA        FIG. IB
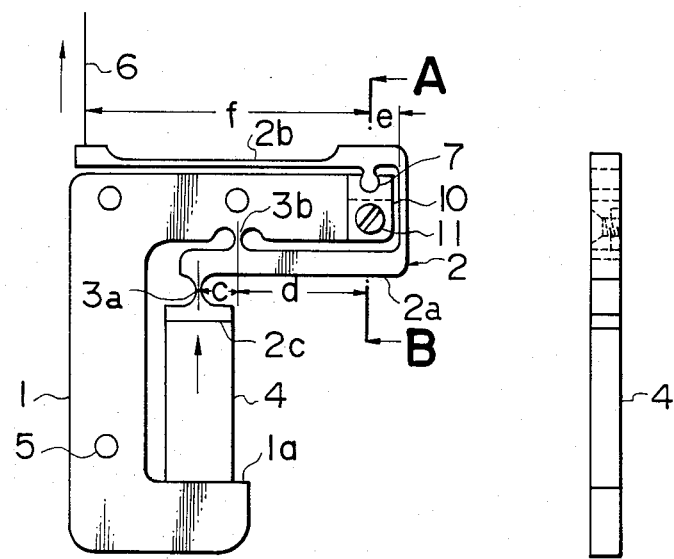

PRIOR ART

PIEZOELECTRIC ACTUATOR

BACKGROUND OF THE INVENTION

This invention relates to piezoelectric actuators which employs the linear reciprocal displacement caused by the transverse effect of a piezoelectric element. The invention more particularly relates to an improved sustaining device for strengthening the stiffness of an amplifying system for use with a piezoelectric element.

Referring to FIG. 5, a conventional piezoelectric actuator will be explained. FIG. 5A is a front view and FIG. 5B is a side view drawing of a known piezoelectric actuator. Numeral 1 denotes a frame. Numeral 2 denotes a mechanical amplifying portion. The frame 1 and the mechanical amplifying portion 2 may be press-formed as one unit, preferably from a material such as spring steel. Numeral 5 denotes a hole which may be drilled in the frame 1 and used for actual installation.

The mechanical amplifying portion 2 comprises a first lever 2a and a second lever 2b, thus configuring a double step amplifying mechanism. Fulcrums 3a, 3b, 3c are equiped with elastic hinges of springs.

A piezoelectric element 4 is inserted between an end 2c of the first lever 2a at the mechanical amplifying portion 2 and a flat inside surface 1a at the lower side wall of the frame 1. The piezoelectric element 4 may be bonded in position with Araldite (tradename).

Under the above described configuration of the actuator, when electric voltage is applied to the piezoelectric element 4, since one end of the piezoelectric element is fixed, a transverse effect generates in the direction of the lower arrow in FIG. 5a. The end 2c of the mechanical amplifying portion 2 is thereby pushed up and displaced. This displacement is transmitted to the mechanical amplifying portion 2 where it is amplified and displaces a transmitting arm 6 in direction of the upper arrow.

In this case, the displacement is amplified by the lever length, measured from fulcrums 3a, 3b and 3c respectively, where c=length from 3a to 3b, d=length from 3b to 3c, e=length associated with fulcrum 3c and f=length from fulcrum 3c to transmitting arm 6, and the displacement by the mechanically amplifying portion 2 is expressed as follows:

$$\text{Displacement} = \text{displacement at the piezoelectric element} \times \frac{d}{c} \times \frac{f}{e}$$

As the above formula indicates, the displacement is amplified by the length of lever measured from fulcrums 3a, 3b, and 3c, respectively.

By deenergizing the electric voltage at the piezoelectric element, displacement at the mechanical amplifying portion 2 is declined and the amplifying portion resumes its original position.

In conventional actuators employing a piezoelectric element, if elastic hinges or springs are applied at the fulcrum points of the mechanical amplification portion 2, the actuator will work fine, for example, in the case of a dot printer whose function is to utilize impulse power. However, if the actuator is used in a functional mechanism where some resisting loads are applied during transmission of displacement to an outside member (for instance, for displacing another movable part), hinges and springs are torsioned and deformed and the expected displacement may not be achieved.

It is therefore an object of the invention to solve the aforementioned problems by providing a mechanical amplifier for a piezoelectric actuator which increases the strength of the amplifier system.

It is a further object of the invention to provide a piezoelectric actuator and amplifier which are strengthened and may be used for a variety of mechanical applications.

SUMMARY OF THE INVENTION

These and other objects of the invention are met by providing a piezoelectric actuator including an amplifying portion which comprises a strengthened last fulcrum. In a conventional system such as is illustrated in FIGS. 5A and 5B, the last step fulcrum 3c receives the largest displacement within the mechanical amplifying portion 2. In the invention, the stiffness at the fulcrum 3c is strengthened so that the limitation on the mechanical amplifying portion 2 at the maximum stress is released. The invention thereby provides a piezoelectric actuator employing a piezoelectric element which is effective to transmit larger displacements to outside members.

BRIEF DESCRIPTION OF THE DRAWINGS

The invention will be described in greater detail below, by way of reference to the following drawings, in which:

FIG. 1A is a front view, and FIG. 1B is a side view, of an accuator according to the present invention;

DETAILED DESCRIPTION OF THE DRAWINGS

Referring to the accompanying drawings, and indicating the same symbols for the same configurations, the present invention will be explained.

Figures 5A, 5B:
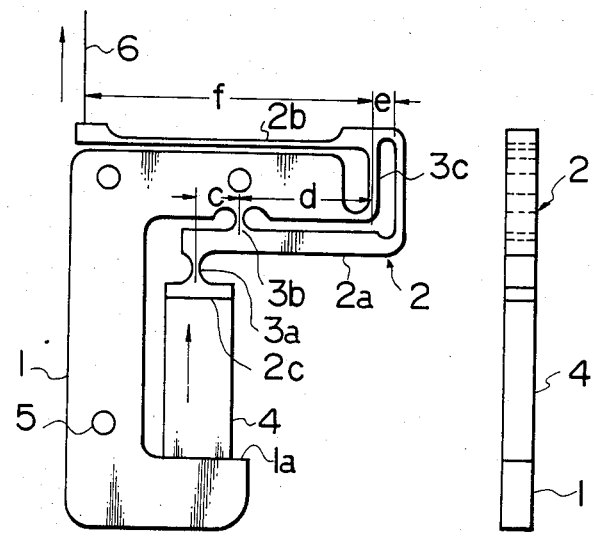
FIGS. 5A and 5B are a front and side view of a conventional actuator.

FIG. 1A is a front view and FIG. 1B is a side view of an apparatus in accordance with the invention. A major difference between the present embodiment and the conventional embodiment of FIGS. 5A and 5B lies in the nature of the fulcrum 3c (see FIG. 5A) which sustains the second lever 2b in the prior art. Contrary to the prior art, the invention instead comprises a semi-pivotal fulcrum 7 (refer to FIG. 1). This semi-pivotal fulcrum 7 includes the parts as shown in FIGS. 2A, 2B and FIGS. 3A, 3B.

Figure 2A:
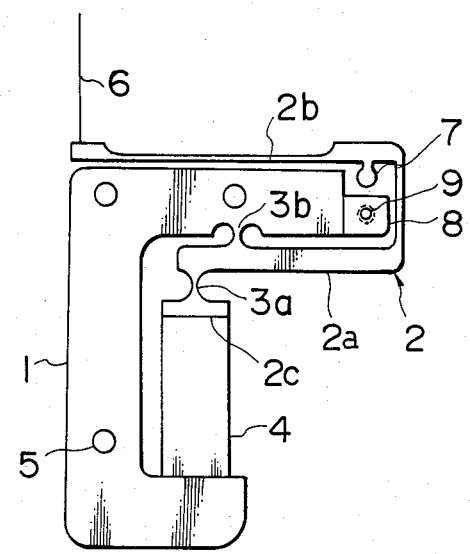
FIG. 2A is a front view.
Figure 2B:
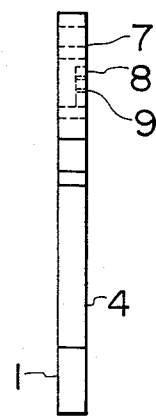
FIG. 2B is a side view of the actuator and amplifier portions of an apparatus according to the invention.

Referring to FIGS. 2A and 2B, numeral 7 denotes the semi-pivotal fulcrum provided at the second lever 2b while numeral 8 denotes a receiving body which is projected from upper right end of the frame 1. The thickness of the receiving body 8 is preferably smaller than that of the frame 1, forming a step-like orientation therewith. The receiving body 8 further provides a screw hole 9.

Figure 3A:
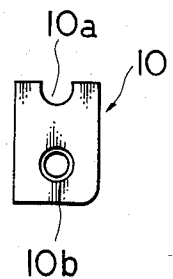
FIG. 3A is a front view and FIG. 3B is a side view of a fulcrum sustaining portion of an apparatus in accordance with the invention.
Figure 3B:
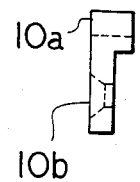

FIG. 3A is a front view and FIG. 3B is a side view of a fulcrum fixing portion 10 which provides a major segmental groove 10a at its upper end and a receiving hole 10b for receiving, for example, a flat head screw. Referring to FIGS. 3A and 3B, the major segmental groove 10a of the fulcrum fixing portion 10 is mounted over the fulcrum portion 7 (refer to FIG. 2) of the second lever 2b of the mechanical amplifying portion 2. The base of the fulcrum fixing portion 10 is fit on the receiving body 8, and both are fastened by a screw 11. (See FIGS. 1A and 1B.)

Figure 4:
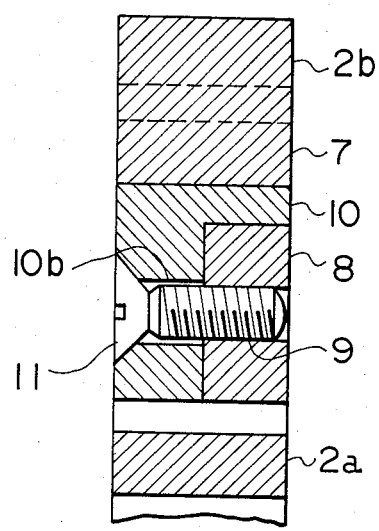
FIG. 4 is a sectional view along the line A-B of FIG. 1.

FIG. 4 is a section view of FIG. 1 taken along line A-B.

The operation of an embodiment in accordance with the invention is similar to the operation of a conventional actuator as described above with regards to FIGS. 5A and 5B. However, in the invention, the fulcrum portion 7 is provided at the second lever 2b and is freely sustained rotatably at the major segmental groove 10a of the fulcrum sustaining portion so that the force emerged at the piezoelectric element 4 may be more effectively utilized.

As aforementioned, the invention employs a piezoelectric element as the driving source, and its displacement is amplified by the mechanically amplifying portion 2, and the transmitting arm 6 finally transmits the displacement. Under such a mechanism, the last step fulcrum 7 sustains the lever 2b which receives the largest displacement, thereby strengthening the stiffness of the last step fulcrum 7 and sustaining the fulcrum freely and rotatably at the major segmental groove 10a. The strengthened fulcrum is effective to be applied not only for actuators which utilizes implusive force but also for actuators which transmit the displacement to an outside member likewise receiving some load against the displacement. Thus, mechanical stiffness of the mechanical amplifying portion 2 is strengthened, and stable transmission of the displacement to the outside is attained, and the reliability of such an actuator is very much promoted.

As many apparently widely different embodiments of the invention may be made without departing the spirit and scope therein, it is to be understood that invention is not limited to the specific embodiments described herein, except as defined in accordance with the appended claims. For example, the fulcrum fixing portion 10 can be fixed directly to the frame 1 instead of being fixed as described in the above configuration, and the mechanical amplifying portion 2 can be organized as a multilever system instead of in two-step lever configuration.

I claim:

1. A piezoelectric actuator comprising:
   a piezoelectric element having one end fixed to a frame;
   a mechanical amplifying portion connected to the other end of said piezoelectric element; and
   a displacement transmitting arm connected in series to a tip portion of said mechanical amplifying portion, said mechanical amplifying portion comprising a lever portion and a plurality of fulcrum portions;
   wherein the last amplifying fulcrum of said mechanical amplifying portion is coupled to a fulcrum fixing means for strengthening said last amplifying fulcrum and is rotatably inserted into a major segmental groove of said fulcrum means.

2. A piezoelectric actuator, as recited in claim 1, wherein said fulcrum fixing means is fixed to said frame.

3. A piezoelectric actuator, as recited in claim 1, wherein said last amplifying fulcrum of said amplifying portion comprises a semi-pivotal fulcrum including a fulcrum portion and a fulcrum fixing portion fixed to said frame.

* * * * *